United States Patent
Wang et al.

(10) Patent No.: US 7,421,776 B2
(45) Date of Patent: Sep. 9, 2008

(54) CLAMP TO ATTACH A STATOR BAR TO A CLIP

(75) Inventors: Yu Wang, Clifton Park, NY (US); David Robert Schumacher, Scotia, NY (US); Lawrence Lee Sowers, Balston Lake, NY (US)

(73) Assignee: General Electric Company, Schenectady, NY (US)

( * ) Notice: Subject to any disclaimer, the term of this patent is extended or adjusted under 35 U.S.C. 154(b) by 383 days.

(21) Appl. No.: 11/143,463

(22) Filed: Jun. 3, 2005

(65) Prior Publication Data
US 2006/0107519 A1    May 25, 2006

Related U.S. Application Data

(60) Provisional application No. 60/628,931, filed on Nov. 19, 2004.

(51) Int. Cl.
*B23P 19/00* (2006.01)
*H02K 15/00* (2006.01)

(52) U.S. Cl. .............................. 29/732; 29/760; 29/596; 29/281.5; 269/21

(58) Field of Classification Search .................. 29/596, 29/732–736, 737; 439/790, 805, 812; 269/93–94, 269/100, 226, 3, 6, 20–21; 310/42–45
See application file for complete search history.

(56) References Cited

U.S. PATENT DOCUMENTS

| | | | |
|---|---|---|---|
| 2,755,760 A * | 7/1956 | Fermanian et al. ........... 228/6.2 |
| 3,686,735 A * | 8/1972 | Hill et al. ...................... 29/732 |
| 4,066,203 A | 1/1978 | Davies |
| 4,309,018 A * | 1/1982 | Reiss .......................... 248/503 |
| 4,552,345 A * | 11/1985 | Benda et al. .................. 269/43 |
| 4,986,771 A | 1/1991 | Braswell |
| 5,494,553 A * | 2/1996 | Colucci ...................... 156/580 |
| 5,528,827 A | 6/1996 | Dailey et al. |
| 5,575,518 A | 11/1996 | Payne |
| 5,895,035 A | 4/1999 | Bley |
| 6,877,731 B1 * | 4/2005 | Corley, Sr. ................... 269/41 |

FOREIGN PATENT DOCUMENTS

| | | |
|---|---|---|
| CH | 683973 A5 | 6/1994 |
| DE | 297 13 944 U1 | 11/1997 |

\* cited by examiner

*Primary Examiner*—Minh Trinh
(74) *Attorney, Agent, or Firm*—Nixon & Vanderhye P.C.

(57) ABSTRACT

A clamp for attaching a clip to an end of a stator bar including: an anchor adapted to fit into an open end of the clamp; a bracket having a first leg extending radially from the anchor and a second leg substantially perpendicular to the first leg, wherein the second leg has a distal end with a pivot point; at least one alignment post on an inside surface of the second leg; a lever arm pivotably attached to the pivot point on the second leg of the bracket, the lever arm further including a lip on a first end of the arm and adapted to releasably engage an edge of a cover to clip, and an adjustment screw threaded through the lever arm and having a first screw end abutting an outside surface of the second leg of the bracket, wherein turning the screw pivots the lever arm and moves the lip towards or away from the cover.

10 Claims, 4 Drawing Sheets ated with a stator bar clip.

CLAMP TO ATTACH A STATOR BAR TO A CLIP

RELATED APPLICATION

This application claims the benefit of U.S. Provisional Application Ser. No. 60/628,931, entitled "Generator Stator Bar Handling, Brazing, and Processing" and filed in the U.S. Patent and Trademark on Nov. 19, 2004, the entirety of this provisional application is incorporated by reference herein.

BACKGROUND OF THE INVENTION

The present invention relates to large stator bars that are used in power and industrial generators, handling these bars before they are installed in a stator, and fitting header clips to the bars during assembly.

Stator bars are typically large, long and heavy, e.g., 35 feet long and hundreds of pounds (lbs.). The bars are generally straight and extend the length of a stator. When seated in a stator, the straight sections of the stator bars form a cylindrical array around a rotor. The ends of the stator bars extend axially from opposite ends of the stator. The end portion of the stator bars extend from the stator and are curved to form end turns. The ends of stator bars are connected through copper or stainless steel fittings and water-cooled connections to form continuous hydraulic winding circuits.

Each water-cooled stator bar comprises an array of small rectangular solid and hollow copper strands. The array of copper strands in each bar are generally arranged in a rectangular bundle. The hollow strands each have an internal duct for conducting coolant through the bar. The ends of the bars are each connected to a hydraulic header clip.

The hydraulic header clip serves as an electrical and a cooling flow connection for the armature winding bar. The hydraulic header clip is a hollow connector that includes an enclosed chamber for ingress or egress of a cooling liquid, typically deionized water. At one open end, the clip encloses the ends of the copper strands of the armature winding bar.

A braze alloy bonds the end sections of the strands to each other and to the hydraulic header clip. The ends of the solid and hollow strands are brazed to a hydraulic header clip fitted to the end of the stator bar. Holding the assembly of strands and header clip together during the braze process is difficult. There is a long felt need for a tool to assist in fitting the hydraulic header clip to the end of a stator bar.

BRIEF DESCRIPTION OF THE INVENTION

A method has been developed to attach a stator clip to a stator bar comprising: placing the clip on an end of the stator bar; clamping the clip together to secure the clip to the stator bar; applying a press to the clip to hold the clip together and to secure the clip to the stator bar; after applying the press, removing the clamp; heating the clip while the press is applied and after the clamp has been removed to braze the clip to the bar, and removing the press and cooling the brazed clip.

A clamp has been developed for attaching a clip to an end of a stator bar, the clamp includes: an anchor adapted to fit into an open end of the clamp; a bracket having a first leg extending radially from the anchor and a second leg substantially perpendicular to the first leg, wherein the second leg further comprises a distal end having a pivot point; at least one alignment post on an inside surface of the second leg; a lever arm pivotably attached to the pivot point on the second leg of the bracket, the lever arm further comprising a lip on a first end of the arm and adapted to releasably engage an edge of a cover to clip, and an adjustment screw threaded through the lever arm and having a first screw end abutting an outside surface of the second leg of the bracket, wherein turning the screw pivots the lever arm and moves the lip towards or away from the cover.

A clamp has been developed for attaching a stator bar clip to an end of a stator bar, said clamp comprising: an anchor adapted to fit into an open end of the clip; a bracket extending outside of the clip from the anchor and to a pivot point, and a lever arm pivotably attached to the pivot point of the bracket, the lever arm further comprising a lip on a first end of the arm adapted to releasably engage an edge of a cover to clip. dr

DETAILED DESCRIPTION OF THE INVENTION

Figure 1:
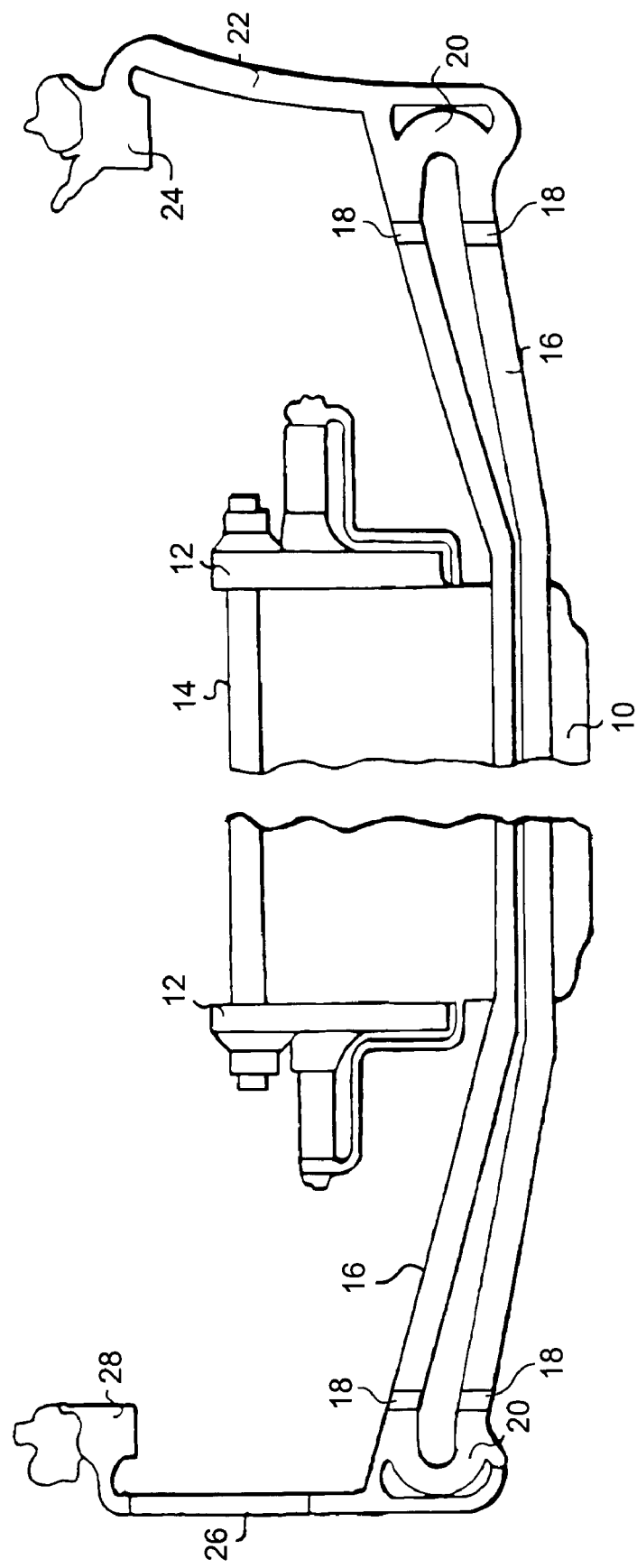
FIG. 1 is a schematic illustration of a liquid-cooled stator winding arrangement illustrating the stator, stator bars and hydraulic header clips coupled to inlet and outlet coolant headers.

FIG. 1 illustrates a liquid-cooled stator bar arrangement for a stator in a typical liquid-cooled generator. A stator core 10 has stator core flanges 12 and core ribs 14. Stator bars 16 (also referred to as armature winding bars) pass through radially extending slots in the stator core and are capped at opposite ends by hydraulic header clips 18 fitted to the ends of the bars. Copper or stainless steel fittings 20 connect adjacent ends of the stator bar pairs to form the complete armature coil. Inlet hoses 22 connect an inlet clip 18 to an inlet coolant header 24. Outlet hoses 26 connect an outlet clip 18 to an outlet coolant header 28. Each stator bar forms a half an armature coil. A pair of stator bars linked at their opposite ends form a complete armature coil.

Figure 2:
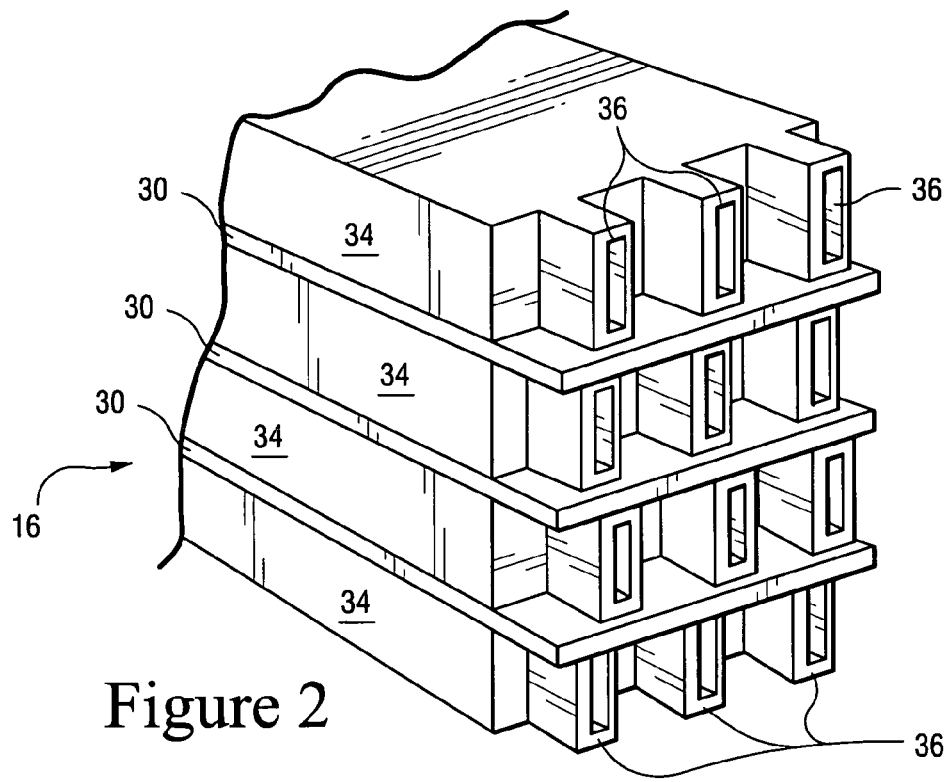
FIG. 2 is a perspective view of the end of an armature winding bar showing the tiered rows of hollow and solid strands, and interleaving sheets of braze material.
Figure 3:
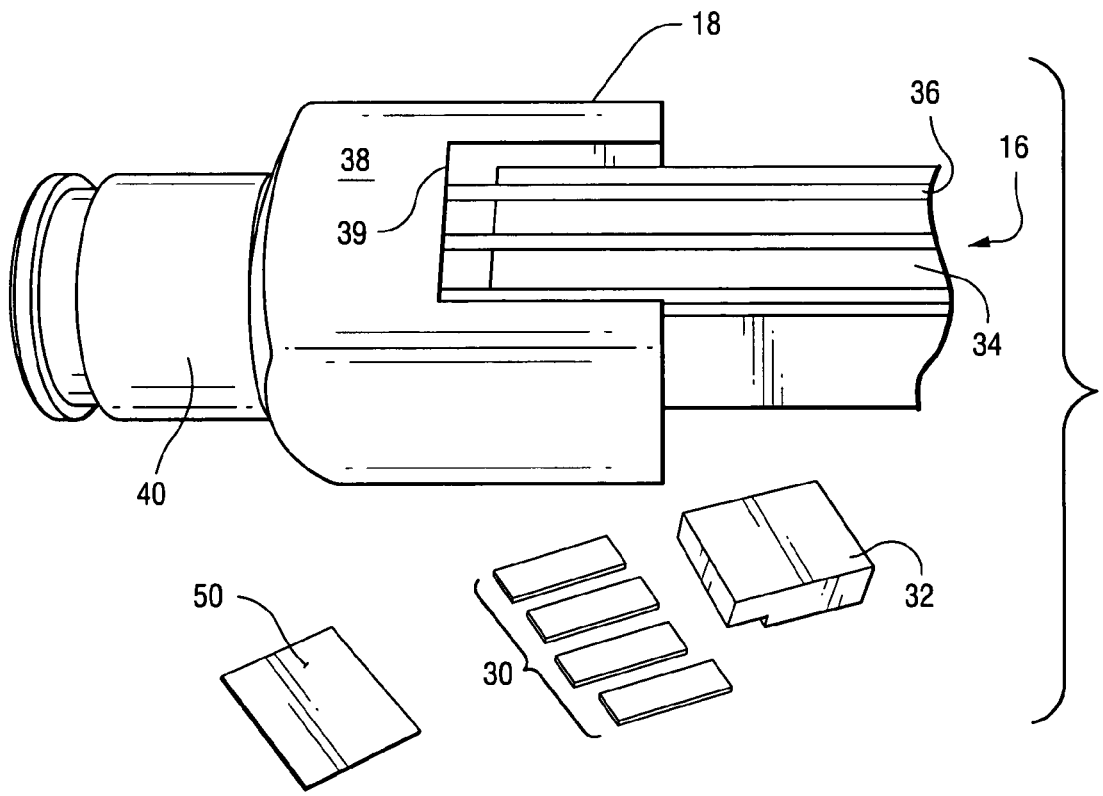
FIG. 3 is a perspective exploded view of the end of an armature winding bar inserted into a hydraulic header clip, with braze material and a clip cover shown to the side of the clip.

FIG. 2 is a perspective end view of an stator bar 16 without a hydraulic header clip. The bar is a rectangular array of solid 34 and hollow 36 copper strands. FIG. 3 is a perspective view of the end of an armature winding bar 16 inserted in a clip 18 with braze strips 30 and a braze sheet 50. A clip cover 32 is shown to the side of the clip 18. In FIG. 2, the braze strips 30 are interleaved between tiered rows of solid the copper strands 34 and rows of hollow strands 36 of the bar 16. Just prior to brazing and at the end of the stator bar, braze strips are inserted between the strands 34, 36. In addition, the braze sheets 50 and clip 32 are assembled in the clip 18.

As shown in FIG. 2, the pre-braze positioned braze alloy strips extend beyond the ends of the short solid strands. The height of the alloy pre-positioned before brazing is selected so that the braze alloy will entirely melt during the braze process and not flow into the open ends of the extended hollow strands.

The hydraulic header clip 18 (also referred to as a stator bar clip) is formed of an electrically conductive material, such as copper. The clip 18 is hollow and includes a rectangular collar 38 that slides over the outer side surfaces of the end of the armature winding bar 16. A rectangular slot 39 in the collar receives the end of the armature winding bar and interleaved strips 30 of the braze alloy. A clip cover 32 fits into the matching rectangular slot 39 in the side of the collar 38. Sheets 50 of braze alloy are arranged around the inside surface of the collar and surrounding the end of the bar. At the other end of the clip 18 is a cylindrical coupling end 40 that is configured to connect to the coolant circuit.

During brazing, the stator bar is held in a vertical position. When the stator bar is vertical the planer end of the bar is horizontal. An end clip 18 is fitted to the end of the stator bar and braze material 30, 50 is placed between the clip and bar. Melted braze alloy forms a pool over the solid strand ends of the stator bar. The braze alloy material 30, 50 may be a rolled, essentially phosphorous-free, silver based braze alloy. After brazing, the braze alloy forms a braze alloy isolation coating over the end of the armature bar (but not the end of the hollow strands). The isolation layer shields the solid strand ends and the joints from the coolant passage in the clip. The braze alloy also bonds the clip to the strands and the strand ends to each other.

Figure 4:
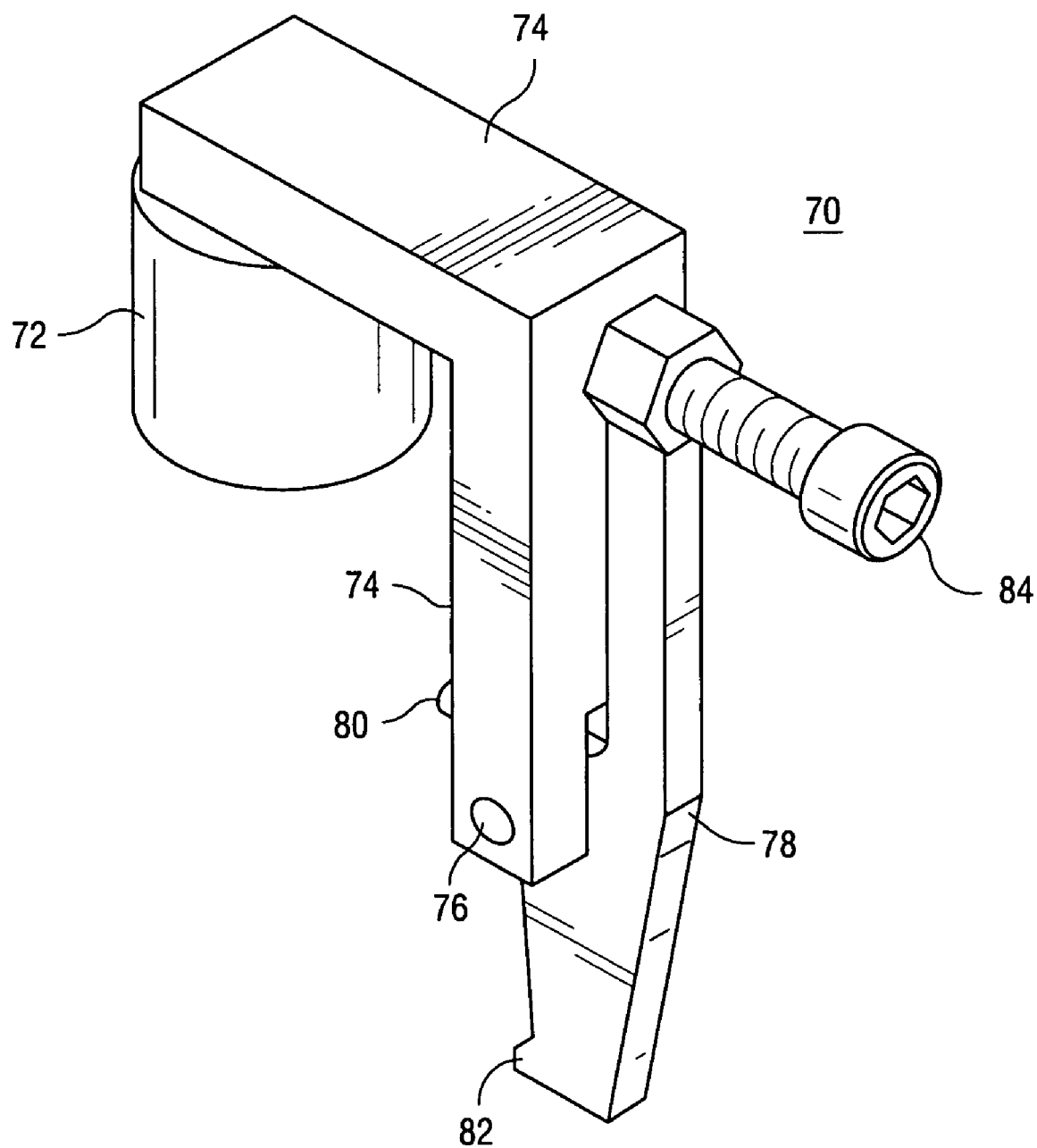
FIG. 4 is a perspective view of a clamp for holding together the winding bar and end clip assembly during brazing.

FIG. 4 is a perspective view of an end clip clamp 70 that holds the assembly of strands, strips, sheets and clip together during the braze operation. The clamp 70 is a tool attached to the clip 18 before brazing and removed thereafter. The clamp includes an anchor 72 that fits into the open hose coupling end 40 of the clip. The anchor may be a cylindrical or half-moon stub that fits snugly in the end 40 (FIG. 3) of the clip. The anchor steadies the clamp 70 with respect clip 18. An L-shaped bracket 74 extends radially from the base of the anchor and beyond the width of the clip, where the bracket turns and extends a portion of the length of the clip.

A pivot pin 76 in the end of the bracket 74 attaches to a lever arm 78. The end of the bracket includes a slot to receive the lever arm. The lever arm fits in the slot and between two fingers at the end of the bracket. On an inside surface of the bracket near the pivot pin are a pair of alignment screws (one shown) 80 that rest against the clip. These screws separate the clamp (and particularly the bracket) from the sidewall of the clamp. The lever arm has a lip 82 to latch onto a far edge of the cover 32 when seated in the slot 39 of the clip. The lip of the lever arm and clamp 70 hold the cover in the clip when the assembly of clip, cover and end of stator are brazed. The lever arm 78 pivots to swing the lip 82 outward and allow a technician to fit the clamp on the clip 18. The lip is pivoted forward to engage the edge of the of the cover and hold the cover in the clip. A jack screw 84 allows the technician to move the lip under the edge of the cover and tightly fit the cover in the slot 39 of the clip. The inside surface of the lip 82 (which engages the cover) is slanted to move the clip cover upward into the slot as the lever arm pivots.

Figure 5:
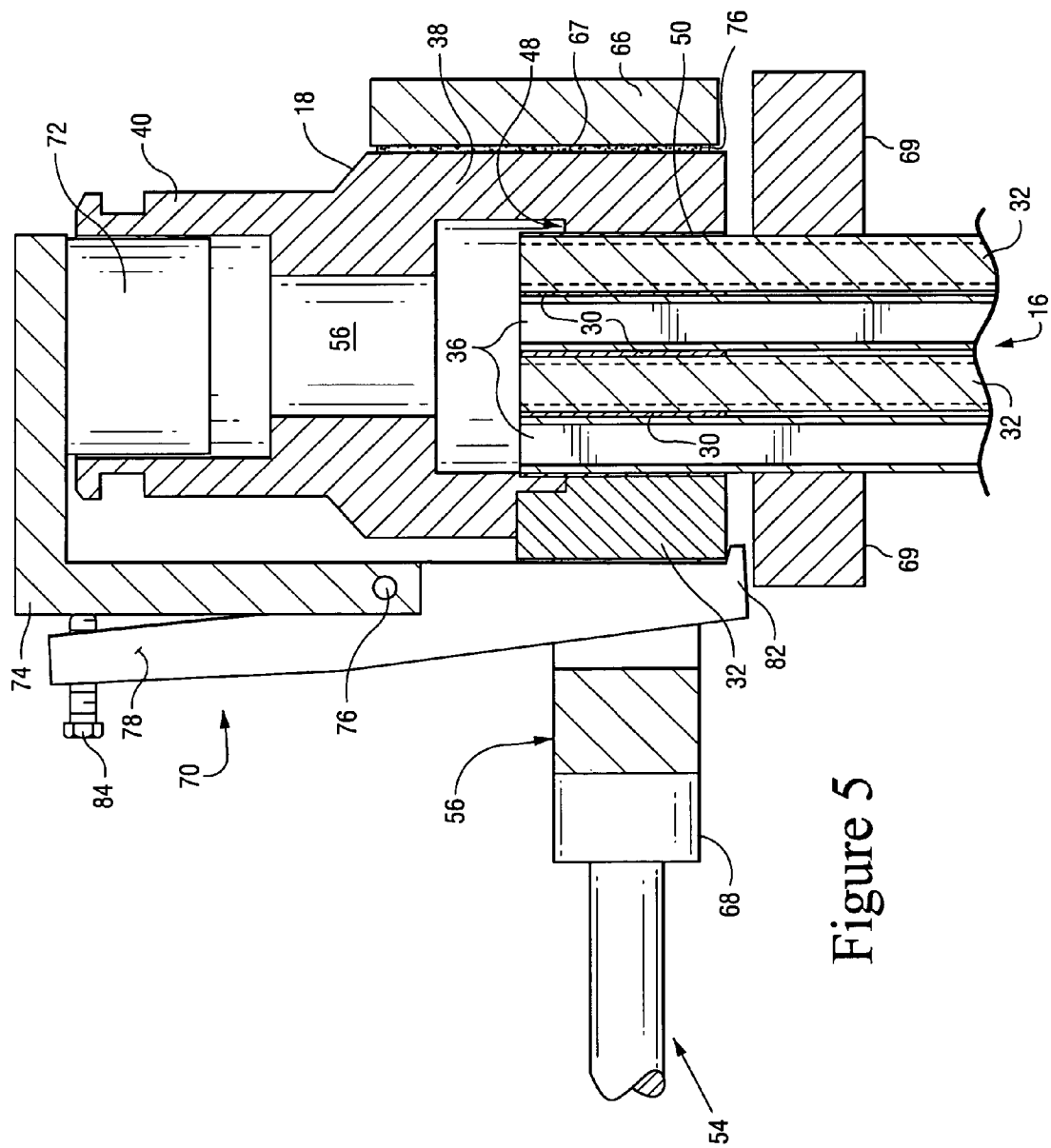
FIG. 5 is an end view of the strands of an armature winding bar within a hydraulic header end clip with a ram clamping the cover to the clip and a heat sink attached to the bar.

FIG. 5 is a cross-sectional end view of the clamp 70 attached to a hydraulic header clip 18, while a ram 54 presses the clip cover 34 into the clip. After the clamp 70 is fitted on the clip, the stator bar, and clip assembly are placed in a brazing device, e.g., a brazing hood. The hood may have an associated cylindrical ram 54 that compresses the clip cover 32 into the header clip 18 during the braze process. The ram 54 presses the clip cover 32 into the collar 38 to compress together the ends of the strands 34, 36 and interleaved braze strips. While the ram 54 presses the cover into the collar and before heating, the clamp 70 is removed from the clip. After the clamp is removed, the clip and bar assembly is heated to liquefy the braze material.

During brazing, the induction heating coil 66 heats the assembly of the clip, strand and braze strips 30 and sheets 50. The heating coil 66 heats the clip and end of the stator bar to braze them together. A heating mass 56 may be placed between the end of the ram 54 and the clip cover 32. The heating mass 56 may be formed a thermally conductive material, such as steel or copper. The heating mass 56 is heated by the heating coil 66 and conducts heat to the clip cover. The heating mass may have an inverted "C" shape in cross-section to fit the end of the ram and fit into the "C" shaped heating coil 66. The heating mass slides between the legs of the heating coil without touching the coil. The heating mass may also have a slot on its front face to receive the lever arm 78 of the clamp 70. The heating mass ensures that heat is applied to the clip cover during brazing.

Mica may be used for spacers 67 separating the coil from the clip and the heating mass 56 from the clip cover. The mica spacer between the coil and clip may be 0.060 inches and the spacer between the mass 56 and clip cover may be 0.030 inches. A thermal mass spacer 68 may be used to insulate the shaft 54 of the ram from the heating mass 56.

A heat sink clamp 69 is attached to the stator bar below the heated end of the bar. The heat sink cools the stator bar below the clip. By cooling the bar, liquefied braze is prevented from flowing down between the strands when the vertical bar is in the braze hood.

The braze joint is preferably made with the stator bar in a vertical orientation. The vertical orientation is preferred because it aids alloy retention in the joint and permits pieces of the alloy to be more easily pre-placed on the surface of the assembly inside the hydraulic header clip, thereby providing a source of additional braze alloy and/or filler metal that will melt and flow over the bar 16 end surfaces to create a thicker layer of braze isolation layer over the ends of the solid copper strands of the bar.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A clamp for attaching a stator bar clip to an end of a stator bar, said clamp comprising:
    an anchor adapted to fit into an open end of the clip;
    a bracket including a first leg extending radially from the anchor and a second leg substantially perpendicular to the first leg, wherein the second leg further comprises a distal end having a pivot point;
    at least one alignment post on an inside surface of the second leg;
    a lever arm pivotably attached to the pivot point on the second leg of the bracket, the lever arm further comprising a lip on a first end of the arm and adapted to releasably engage an edge of a cover to clip, and
    an adjustment screw threaded through the lever arm and having a first screw end abutting an outside surface of the second leg of the bracket, wherein turning the screw pivots the lever arm and moves the lip towards or away from the cover.

2. The clamp in claim 1 wherein the alignment post is a pair of threaded posts.

3. The clamp in claim 1 wherein the alignment post is a pair of threaded posts.

4. The clamp in claim 1 wherein the anchor is substantially cylindrical.

5. The clamp in claim 1 wherein the anchor is half-moon in cross-section.

6. The clamp in claim 1 wherein the anchor has a cross-sectional shape conforming to an aperture in the open end of the clip.

7. The clamp in claim 1 wherein the bracket has a substantially L-shape.

8. The clamp in claim 1 wherein the first leg of the bracket is at a substantially right angle to the second leg of the bracket.

9. The clamp in claim 1 wherein the lever arm fits into a slot between two fingers at the end of the second leg of the bracket.

10. A clamp for attaching a stator bar clip to an end of a stator bar, said clamp comprising:

an anchor adapted to fit into an open end of the clip;

a bracket extending outside of the clip from the anchor and to a pivot point;

a lever arm pivotably attached to the pivot point of the bracket, the lever arm further comprising a lip on a first end of the arm adapted to releasably engage an edge of a cover to clip, and an adjustment screw threaded through the lever arm and having a first screw end abutting an outside surface of the bracket, wherein turning the screw pivots the lever arm and moves the lip towards or away from the cover.

\* \* \* \* \*